United States Patent [19]

Morishita et al.

[11] Patent Number: 4,539,515
[45] Date of Patent: Sep. 3, 1985

[54] VEHICULAR DIRECT-CURRENT THREE-WIRE ELECTRIC SYSTEM

[75] Inventors: Mitsuharu Morishita; Mitsuyoshi Yokota; Akio Matsumoto, all of Hyogo, Japan

[73] Assignee: Mitsubishi Denki Kabushiki Kaisha, Tokyo, Japan

[21] Appl. No.: 475,829

[22] Filed: Mar. 16, 1983

[30] Foreign Application Priority Data

| Mar. 18, 1982 | [JP] | Japan | 57-44027 |
| Mar. 23, 1982 | [JP] | Japan | 57-47914 |
| Mar. 23, 1982 | [JP] | Japan | 57-42004[U] |
| Mar. 23, 1982 | [JP] | Japan | 57-42007[U] |
| Mar. 23, 1982 | [JP] | Japan | 57-42006[U] |
| Mar. 23, 1982 | [JP] | Japan | 57-42005[U] |
| Apr. 9, 1982 | [JP] | Japan | 57-60747 |

[51] Int. Cl.³ .............................................. H02J 7/16
[52] U.S. Cl. ........................................ 320/17; 307/16; 307/84; 320/64
[58] Field of Search ............... 307/16, 84; 320/15, 320/18, 64, 61, 17; 322/90

[56] References Cited

U.S. PATENT DOCUMENTS

| 3,710,226 | 1/1973 | Selke | 320/15 |
| 3,793,544 | 2/1974 | Baumgartner et al. | 320/17 |
| 3,809,995 | 5/1974 | Hardin | 231/5 |
| 4,045,718 | 8/1977 | Gray | 320/17 |
| 4,156,836 | 5/1979 | Wiley | 307/84 X |
| 4,347,473 | 8/1982 | Stroud | 320/15 |
| 4,454,464 | 6/1984 | Stroud | 307/84 X |

FOREIGN PATENT DOCUMENTS 882338 7/1949 Fed. Rep. of Germany .

*Primary Examiner*—R. J. Hickey
*Attorney, Agent, or Firm*—Sughrue, Mion, Zinn, Macpeak, and Seas

[57] ABSTRACT

A vehicular charging and starting system is improved by providing first and second a.c. generators, rectifiers and voltage regulators, the negative terminal of the first rectifier and the positive terminal of the second rectifier being connected to a neutral or body grounded conductor. A pair of batteries are respectively positively and negatively connected to said neutral or grounded conductor. Protection circuits may be provided for overcurrent protection of the rectifiers or electrical loads, and for preventing the starter motor from rotating at an excessive speed once the engine is started.

15 Claims, 15 Drawing Figures

4,539,515

VEHICULAR DIRECT-CURRENT THREE-WIRE ELECTRIC SYSTEM

BACKGROUND OF THE INVENTION

The present invention relates to a vehicular direct-current three-wire electrical system which is suitably connected for the wiring and control of both a system for charging a storage battery with the rectified output of an alternating-current generator mounted on the vehicle and driven by an internal combustion engine and the starter system of that internal combustion engine.

First of all, a prior art system of the above-specified type will be described with reference to FIG. 1. In FIG. 1, reference numberal 1 indicates an alternating-current generator which is mounted on a vehicle (not shown) and which is driven by an internal combustion engine (not shown). The a.c. generator is constructed of armature coils 101 in the three-phase star-connection and a field coil 102. Numeral 2 indicates a three-phase full wave rectifier for rectifying the a.c. output of the a.c. generator 1. The rectifier 2 has a plus output terminal 201 and a minus output terminal 202.

Moreover, numeral 3 indicates a voltage regulator for controlling the output voltage of the a.c. generator 1 so as to equal a predetermined value by controlling the current flowing through the aforementioned field coil 102. A first storage battery 5 is connected between the plus and minus output terminals 201, 202 of the aforementioned three-phase full-wave rectifier 2, and a key switch 9 is connected between the plus terminal of the first storage battery 5 and the voltage regulator 3.

An electric load 7 is connected in parallel with the first storage battery 5, which has its plus and minus terminals connected to each other through the drive coil 401 of an electromagnetic relay 4. The electromagnetic relay 4 is provided for switching the connection between the first storage battery and a second storage battery 6 from series to parallel and vice versa.

The electromagnetic relay 4 is constructed of the drive coil 401, a first movable contact 402, a second movable contact 402, a first normally open stationary contact 404, a second normally open stationary contact 405, a first normally closed stationary contact 406 and a second normally closed stationary contact 407.

The first movable contact 402 is connected to the plus terminal of the first storage battery 5, and the second movable contact 403 is connected to the minus terminal of the second storage battery 5. The first and second movable contacts 402 and 403 are made coactive with each other. The plus terminal of the second storage battery 6 is connected with the first normally closed stationary contact 406 and further through the starting motor 8 of the internal combustion engine with the minus terminal of the first storage battery 5. On the other hand, the second normally closed stationary contact 407 is connected with the minus terminal of the first storage battery 5.

The operation of the prior art system thus arranged will now be described. Initially, when the key switch 9 is closed upon starting of the internal combustion engine, a field current is supplied from the first storage battery 5 through the key switch 9 and the voltage regulator 3 to the field coil 102 so that a field magnetomotive force is generated.

Next, when the operating switch 10 is closed, the drive coil 401 of the electromagnetic relay 4 is energized to drive the first movable contact 402 and the second movable contact 403. As a result, the first movable contact 402 is open-circuited with respect to the first normally closed stationary contact 406 but is closed with respect to the first normally open stationary contact 404. Simultaneously, the second movable contact 403 is coactively open-circuited with respect to the second normally closed stationary contact 407 but is closed with respect to the second normally open stationary contact 405. As a result, the starting motor 8 is supplied with the series-connected voltage of the first and second storage batteries 5 and 6.

When the starting motor 8 rotates in this state to start the internal combustion engine, an a.c. output is induced in the armature coils 101. This a.c. output is full-wave rectified by the three-phase full-wave rectifier 2 to charge the first storage battery 5. The aforementioned rectified output is controlled to equal the predetermined value by the voltage regulator 3.

When the starting switch 10 is opened after the start of the internal combustion engine, the first and second storage batteries 5 and 6 are connected in parallel with each other so that they are simultaneously charged by the a.c. generator 1 and the three-phase full-wave rectifier 2.

The aforementioned system of the prior art requires the electromagnetic relay 4 for switching between the series and parallel connections between the first and second storage batteries 5 and 6, and thus has drawbacks in that its lifetime is shortened, and that its reliability is degraded.

SUMMARY OF THE INVENTION

The present invention has been conceived in order to eliminate the aforementioned defects concomitant with the prior art, and has an object of providing a vehicular direct-current three-wire electrical system which does not require an electromagnetic relay, by connecting the minus output terminal of a first rectifier and the plus output terminal of a second rectifier and by extracting a neutral conductor or an earth conductor to thereby form a direct-current three-wire circuit enabling simplification of the circuit construction, and improvements in reliability.

DETAILED DESCRIPTION OF THE PREFERRED EMBODIMENTS

Figure 1:
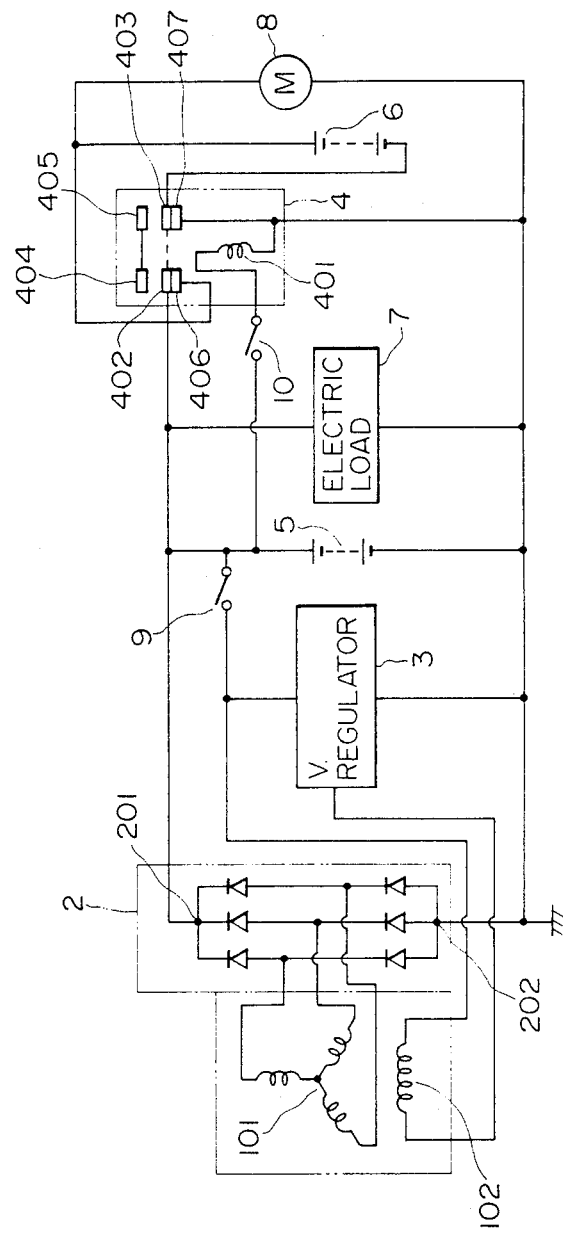
FIG. 1 is a circuit diagram illustrating a prior art vehicular starting and battery charging system.
Figure 2:
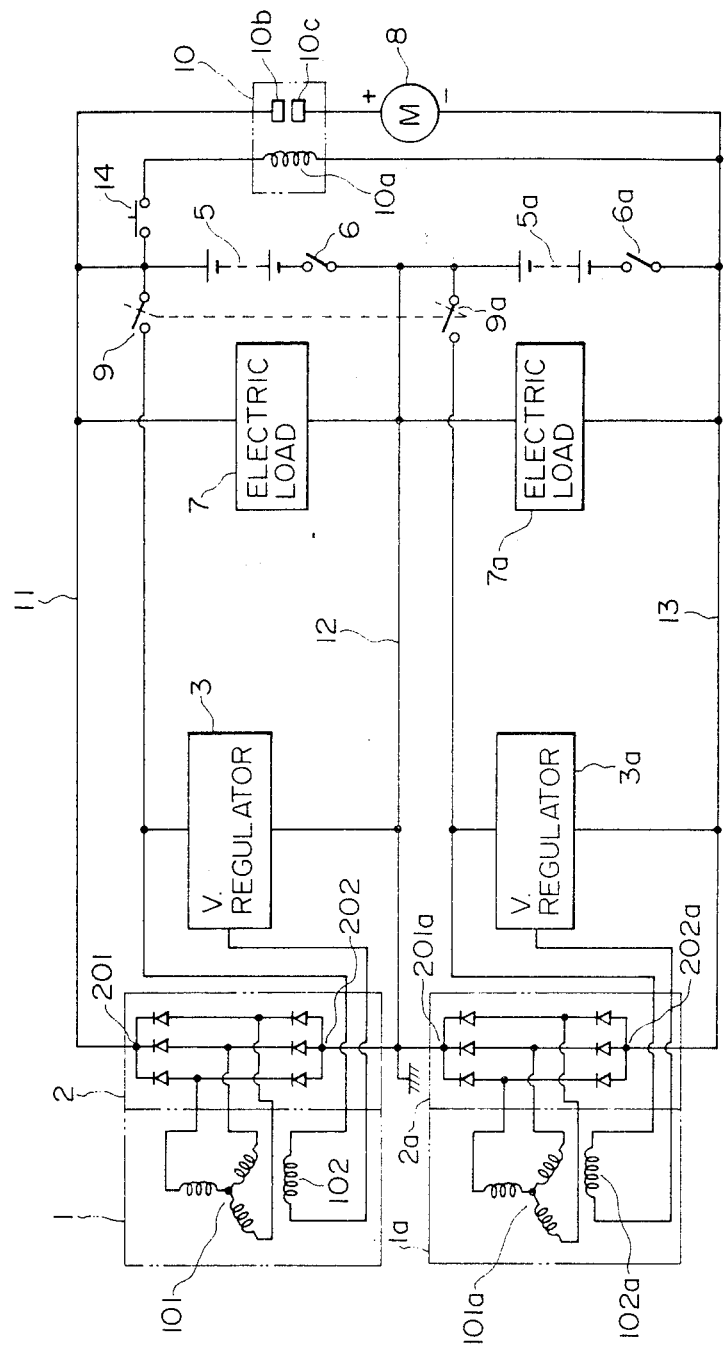
FIG. 2 is a circuit diagram illustrating a vehicular storage battery charging system according to one embodiment of the present invention.

The vehiclar direct-current three-wire electrical system according to the present invention will now be described in connection with specific embodiments thereof with reference to the accompanying drawings. FIG. 2 is a circuit diagram showing one of these embodiments. In FIG. 2, portions or parts identical to those appearing in FIG. 1 are indicated by identical reference numerals.

In FIG. 2, reference numeral 1 indicates an alternating-current generator constructed of armature coils 101 and a field coil 102. The armature coils are star-connected and have their output terminals connected with the input of a first three-phase rectifier 2. This three-phase free-wave rectifier has its plus output terminal 201 connected to a plus conductor 11 and its minus output terminal 202 connected to a neutral conductor 12, which in turn is grounded to earth (or the vehicle body).

Between these plus and minus conductors 11 and 12, there is connected a first storage battery 5, which in turn is connected in parallel with a first electric load 7. In parallel with the first storage battery 5, there is connected through a first key switch 9 a first voltage regulator 3, which is made operative to control the output voltage of the first a.c. generator so as to equal a desired value by controlling the current flowing through the field coil 102.

On the other hand, numeral 1a indicates a second a.c. generator, which is constructed of star-connected armature coils 101a and a field coil 102a similar to the first a.c. generator 1. The armature coils 101a are connected with the input of a second three-phase full-wave rectifier 2a, which has its plus output terminal 201a connected to the neutral conductor 12. Moreover, the minus output terminal 202a of the second three-phase full-wave rectifier 2a is connected to a minus conductor 13. A starting motor 8 is connected between the minus conductor 13 and the plus conductor 11.

On the other hand, a second storage battery 5a has its minus terminal connected to the minus conductor 13 and its plus terminal connected to the neutral connector 12. A second electric load 7a is connected in parallel with the second storage battery 5a. In parallel with the second storage battery 5a, there is connected a second voltage regulator 3a through a second key switch 9a, which is made coactive with the first key switch 9. The second voltage regulator 3a is provided to control the generator output voltage similarly to the first regulator 3. Numeral 6 indicates a first battery switch, which has a stationary contact connected to the minus terminal of the first storage battery 5 and a movable contact connected to the neutral conductor 12. Numeral 6a indicates a second battery switch which has a stationary contact connected to the minus terminal of the second storage battery 5a and a movable contact connected to the minus conductor 13. Moreover, numeral 10 indicates an electromagnetic relay for driving the starter motor 8, which is constructed of a drive coil 10a having a minus terminal connected to the minus connector 13, a normally open stationary contact 10b connected to the plus conductor 11, and a normally open movable contact 10c connected to the plus terminal of the starter motor 8. Numeral 14 indicates a starter switch which has one stationary contact connected to the other terminal of the drive coil 10a of the driving electromagnetic relay 10. As earlier mentioned, the first and second key switches 9 and 9a are made coactive with each other.

The operation of the vehicular direct-current three-wire electric system thus constructed according to the present invention will now be described. When the first and second key switches 9 and 9a and the first and second battery switches 6 and 6a are closed while the engine is not running, field currents are supplied from the first storage battery 5 through the first key switch 9 and the first voltage regulator 3 to the field coil 102 and from the second storage battery 5a through the second key switch 9a and the second voltage regulator 3a to the field coil 102a so that the respective field coils 102 and 102a generate a field electromotive force.

When the starter switch 14 is closed in this state, the drive coil 10a of the driving electromagnetic relay 10 is energized through the closed circuit of the plus terminal of the first storage battery 5—starter switch 14—the driving coil 10a—the second battery switch 6a in its closed state—the second storage battery 5a—the first battery switch 6 in its closed state—and the minus terminal of the first storage battery 5. As a result, by the energization of the driving coil 10a, the normally open movable contact 10c is actuated to contact the normally open stationary contact 10b. As a result, the starting motor 8 is rotated by the voltage applied from the first and second storage batteries 5 and 5a connected in series. As a result, the internal combustion engine (not shown) is started to rotate the first and second a.c. generators 1 and 1a. This results in the induction of a.c. outputs in the armature coils 101 of the first a.c. generator 1 and 101a of the second a.c. generator 1a. The resultant outputs respectively charge the first and second storage batteries 5 and 5a and are supplied to the first and second electric loads 7 and 7a after they have been respectively full-wave rectified by the first and second three-phase full-wave rectifiers 2 and 2a. On the other hand, the rectified outputs are respectively controlled to equal predetermined values by the first and second voltage regulators 3 and 3a.

While the foregoing embodiment is directed by way of example only to the case in which the two a.c. generators 1 and 1a are used, similar effects can be attained even if the first and second a.c. generators 1 and 1a are constructed so as to have a common shaft.

Although the neutral conductor 12 is grounded to earth in the embodiment of FIG. 2, moreover, similar effects can naturally be attained even if the same is not grounded.

The three-wire charging system shown in FIG. 2 uses two key switches as a coacting switch, which items are not standard ones causing them to be relatively expensive. It is, therefore, conceivable that a single-acting key switch can be used to thereby reduce costs and improve reliability. An embodiment taking this point into consideration is shown in FIGS. 3 and 4.

Figure 3:
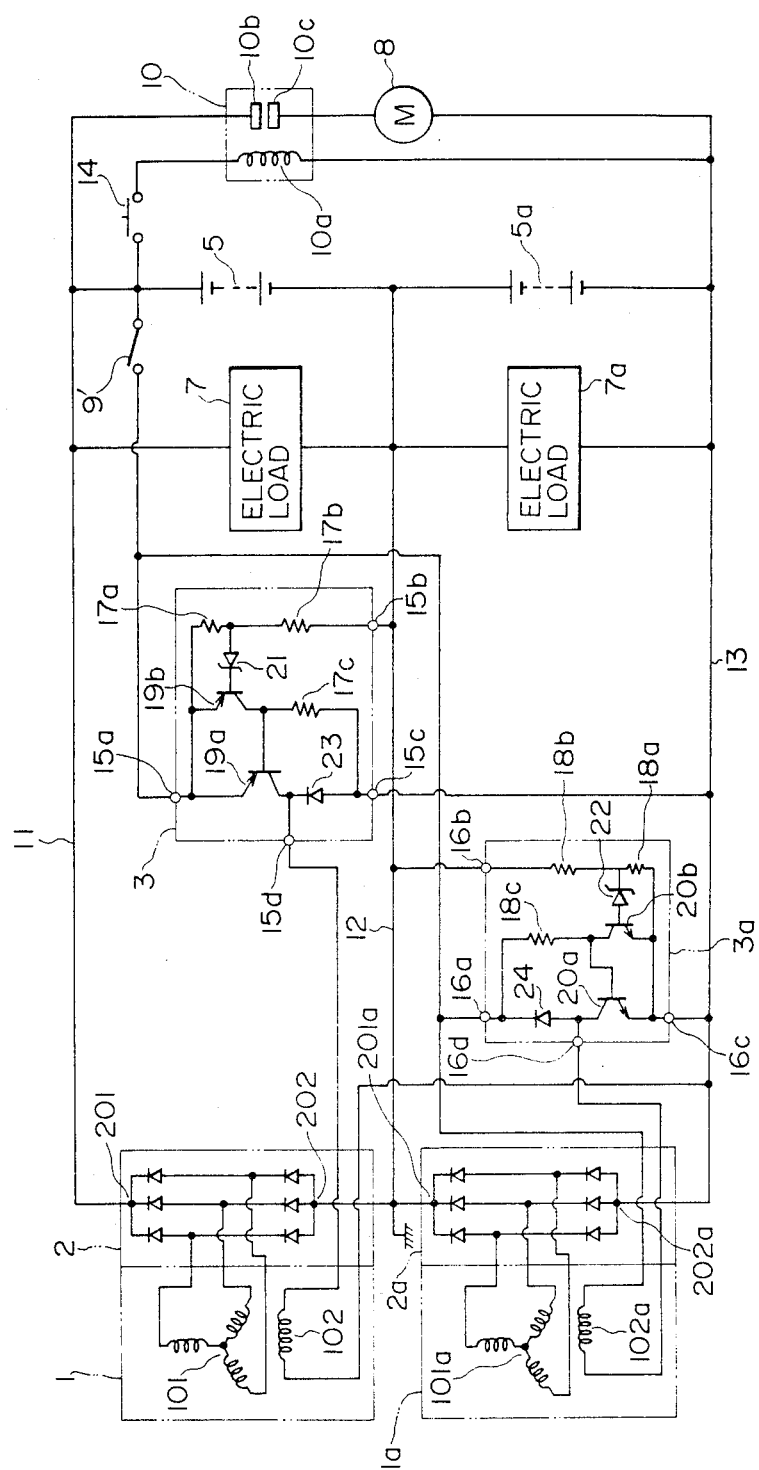
FIG. 3 is a circuit diagram of a second embodiment of the invention employing a simplified switch arrangement.
Figure 4:
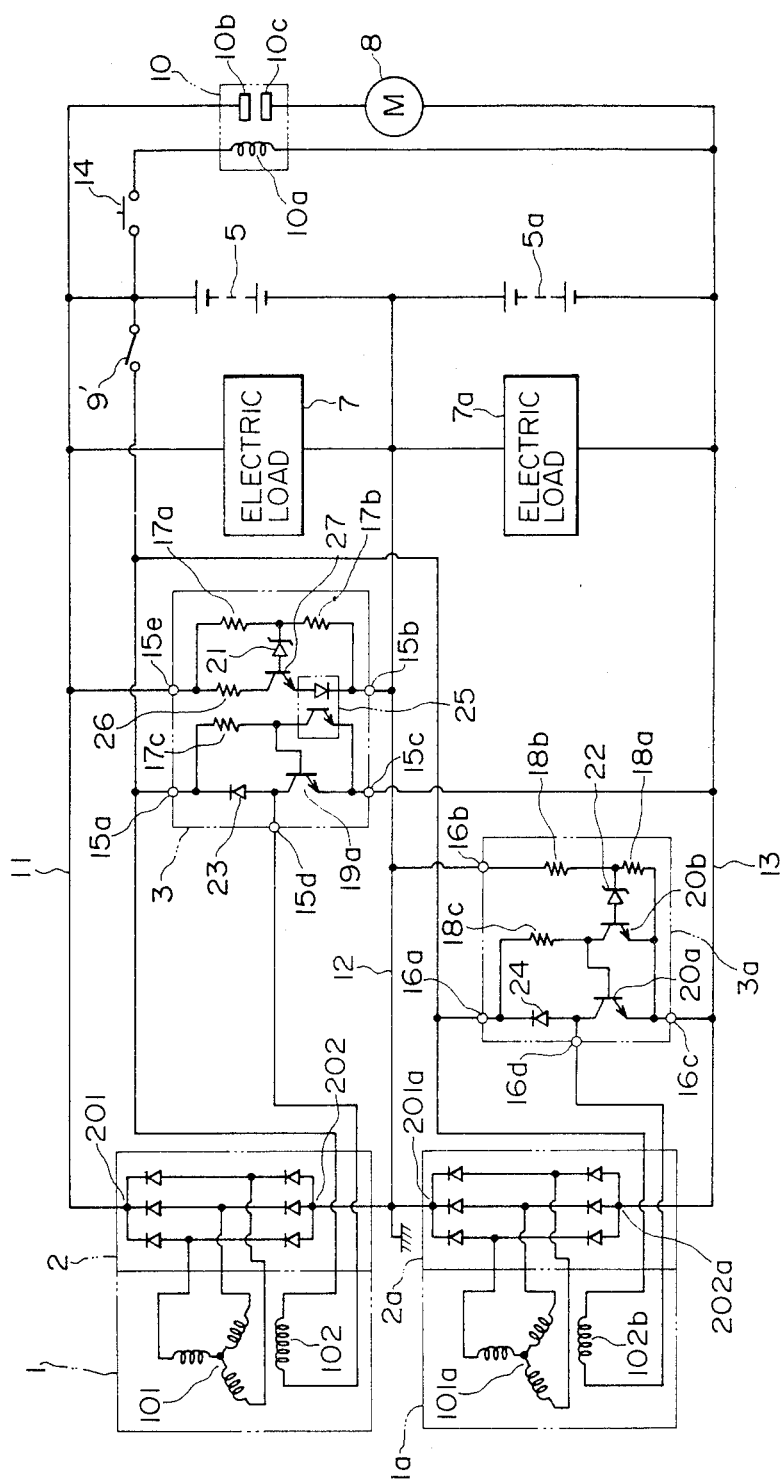
FIG. 4 illustrates a modification of the arrangement shown in FIG. 3.

In FIG. 3, reference numeral 9' indicates a single-acting key switch. Numerals 3 and 3a respectively indicate first and second voltage regulators which are made operative to control the output voltages of the first and second a.c. generators 1 and 1a to predetermined values by controlling the currents flowing through the field coil 102 of the first a.c. generator 1 and the field coil 102a of the second a.c. generator 1a. The first and second voltage regulators 3 and 3a are respectively constructed of plus power source terminals 15a and 16a connected to the stationary contact of that single-acting key switch 9', earth terminals 15b and 16b connected to the neutral conductor 12, minus power source terminals 15c and 16c connected to the minus conductor 13, and output terminals 15d and 16d connected respectively to terminals of the field coils 102 and 102a.

In the first and second voltage regulators 3 and 3a, moreover, reference numerals 17a and 17b and 18a and 18b respectively indicate voltage-dividing resistors. Numerals 17c and 18c indicate base resistors. Numerals 19a and 20a respectively indicate output transistors for connecting and disconnecting the field currents of the field coils 102 and 102a. Numerals 19b and 20b respectively indicate control transistors for rendering the output transistors 19a and 20a conductive and nonconductive. Numerals 21 and 22 respectively indicate Zener diodes which are rendered conductive when predetermined values are reached by the output voltages of the first and second a.c. generators 1 and 1a. Numerals 23 and 24 respectively indicate surge-absorbing diodes which are connected to the two terminals of the field coils 102 and 102a to absorb surges.

The operation of the vehicular d.c. three-wire charging system thus constructed will now be described. When the key switch 9' is closed in the state wherein the internal combustion engine is not running, the output transistor 19a of the first voltage regulator 3 has its base fed with a base current through the closed circuit of the plus terminal of the first storage battery 5—the key switch 9'—the plus terminal 15a of the first voltage regulator 3—the emitter-base of the output transistor 19a—the base resistor 17c—the minus power source terminal 15c—the second storage battery 5a—the minus terminal of the first storage battery 5 so that it is rendered conductive. As a result, field current flows to the electromagnetic coil 102 of the first a.c. generator 1 through the closed circuit of the plus terminal of the first storage battery 5—the key switch 9'—the plus terminal 15a of the first voltage regulator 3—the emitter-collector of the output transistor 19a—the output terminal 15d—the field coil 102—the minus conductor 13—the second storage battery 5a—the minus terminal of the first storage battery 5 so that a field magnetomotive force is generated. Likewise, by the closure of the aforementioned key switch 9', the output transistor 20a of the second voltage regulator 3a has its base fed with base current through the closed circuit of the plus terminal of the first storage battery 5—the key switch 9'—the plus terminal 16a of the second voltage regulator 3a—the base resistor 18c—the base-emitter of the output transistor 20a—the minus power source terminal 16c—the minus conductor 13—the second storage battery 5a—the minus terminal of the first storage battery 5 so that the output transistor 20a is rendered conductive. As a result, field current flows to the field coil 102a of the second a.c. generator 1a through the closed circuit of the plus terminal of the first storage battery 5—the key switch 9'—the field coil 102a—the output terminal 16d—the collector-emitter of the output transistor 20a—the minus power source terminal 16c—the minus conductor 13—the second storage battery 5a—the minus terminal of the first storage battery 5. When the internal combustion engine is started in this state, a.c. outputs are induced in the armature coil 102 of the first a.c. generator 1 and in the armature coil 102a of the second a.c. generator 1a. After having been full-wave rectified by the first and second three-phase full-wave rectifiers 2 and 2a, respectively, those a.c. outputs respectively charge the first and second storage batteries 5 and 5a and are respectively fed to the first and second electric loads 7 and 7a. Here, when the r.p.m. of the internal combustion engine is increased so that the voltage between the plus output terminal 201 and the minus output terminal 202 of the first three-phase full-wave rectifier 2 is raised, the voltage divided by the voltage-dividing resistors 17a and 17b of the first voltage regulator 3 will exceed the predetermined value. As a result, the Zener diode 21 is rendered conductive to render the control transistor 19b conductive. As a result, the output transistor 19a is rendered nonconductive to reduce the field current flowing through the field coil 102. This reduces the a.c. output induced from the first a.c. generator 1. Likewise, when the voltage between the plus output terminal 201a and the minus output terminal 202a of the second three-phase full-wave rectifier 2a rises, the voltage divided by the voltage-dividing registors 18a and 18b of the second voltage regulator 3a will exceed the predetermined value. As a result, the Zener diode 22 is rendered conductive to render the control transistor 20b conductive. As a result, the output transistor 20a is rendered nonconductive to reduce the field current flowing through the field coil 102a. This results in a reduction in the a.c. output induced from the second a.c. generator 1a. The output voltages of the first and second a.c. generators 1 and 1a are respectively controlled by repeating the operations thus far described.

FIG. 4 is a block diagram showing another embodiment of the vehicular d.c. three-wire charging system shown in FIG. 3. This embodiment is specific in that a photocoupler is used in the first voltage regulator 3. In FIG. 4, reference numerals 25, 26 and 27 indicate a photocoupler, a resistor and a transistor 27, respectively.

The operation of this modification is naturally similar to that of FIG. 3.

The following detailed description, with reference to the accompanying drawings, is directed to countermeasures against adverse effects caused for other circuit elements due to malfunctions of the circuit elements of the aforementioned vehicular charging system, or against problems invited by the circuit construction.

Initially let it be assumed that the battery switch connection becomes deteriorated. In the system of FIG. 2, more specifically, when the second battery switch 6a, for example, has a deteriorated contact, the driving coil 10a of the driving electromagnetic relay 10 is energized by the closure of the starting switch 14 through the closed circuit of the plus terminal of the first storage battery 5—the starting switch 14—the driving coil 10a of the driving electromagnetic relay 10—the minus conductor 13—the second three-phase full-wave rectifier 2a—the neutral conductor 12—the first battery switch 6—the minus terminal of the first storage battery 5. As a result, the normally open movable contact 10c of the driving electromagnetic relay 10 is actuated to come into contact with the normally open stationary contact 10b. As a result, a large current flows through the closed circuit of the plus terminal of the first storage battery 5—the normally open stationary contact 10b and the normally open movable contact 10c of the driving electromagnetic relay 10—the starter motor 8—the minus conductor 13—the second three-phase full-wave rectifier 2a—the neutral conductor 12—the first battery switch 6—the minus terminal of the first storage battery 5 to thereby damage the second three-phase full-wave rectifier 2a. Likewise, when the first battery switch 6 has a deteriorated contact, a large current flows to damage the first three-phase full-wave rectifier 2. Likewise, if either the terminal portion of the first storage battery 5 or the terminal portion of the second storage battery 5a has a deteriorated contact, or if either of the first a.c. generator 1 or the second a.c. generator 1a generates no power, either the electrical load (not shown) connected between the neutral conductor 12 and the minus conductor 13 or the electrical load (not shown) connected between the plus conductor 11 and the neutral conductor 16 may possibly be damaged.

Figure 5:
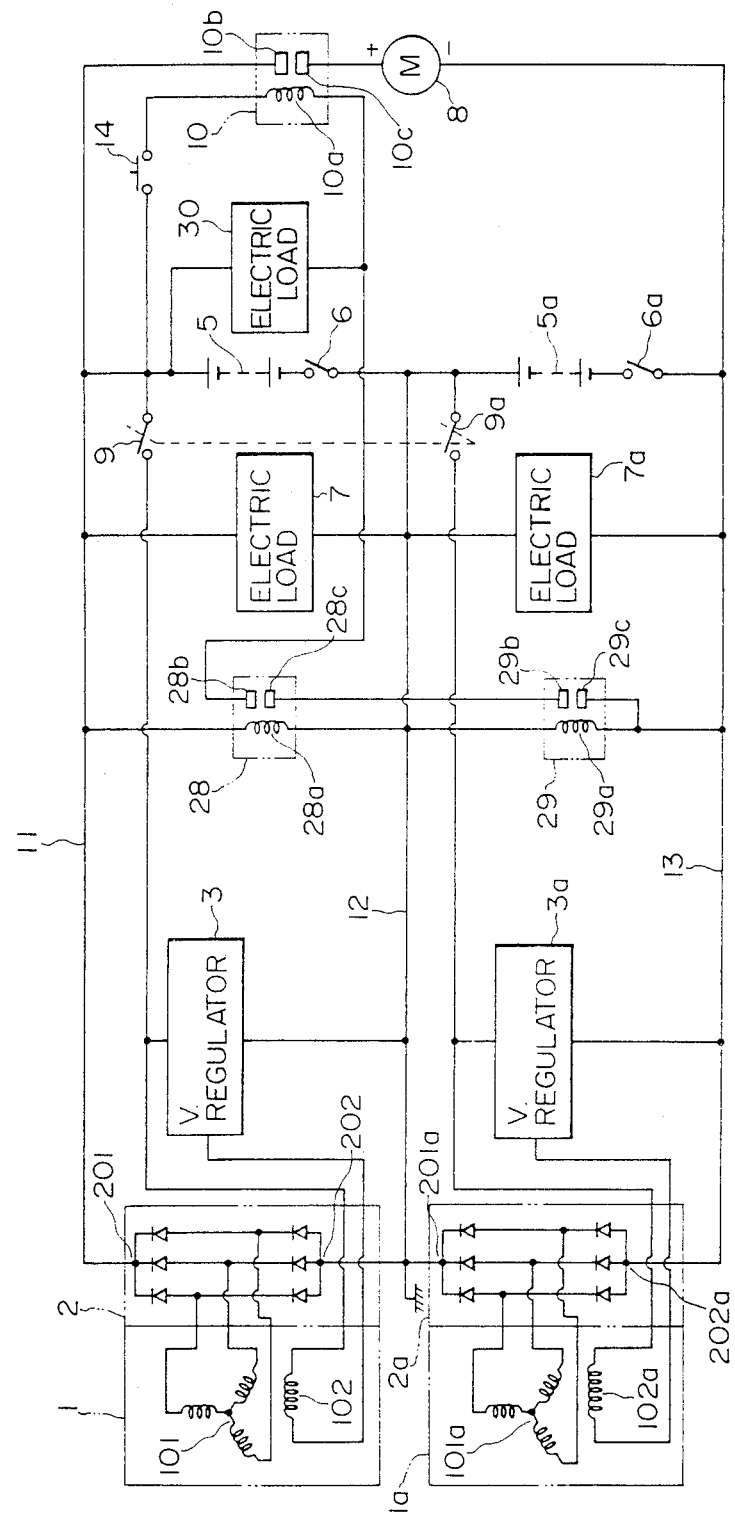
FIG. 5 a circuit diagram similar to FIG. 2 illustrating a method of overcurrent protection for the rectifier circuits.
Figure 6:
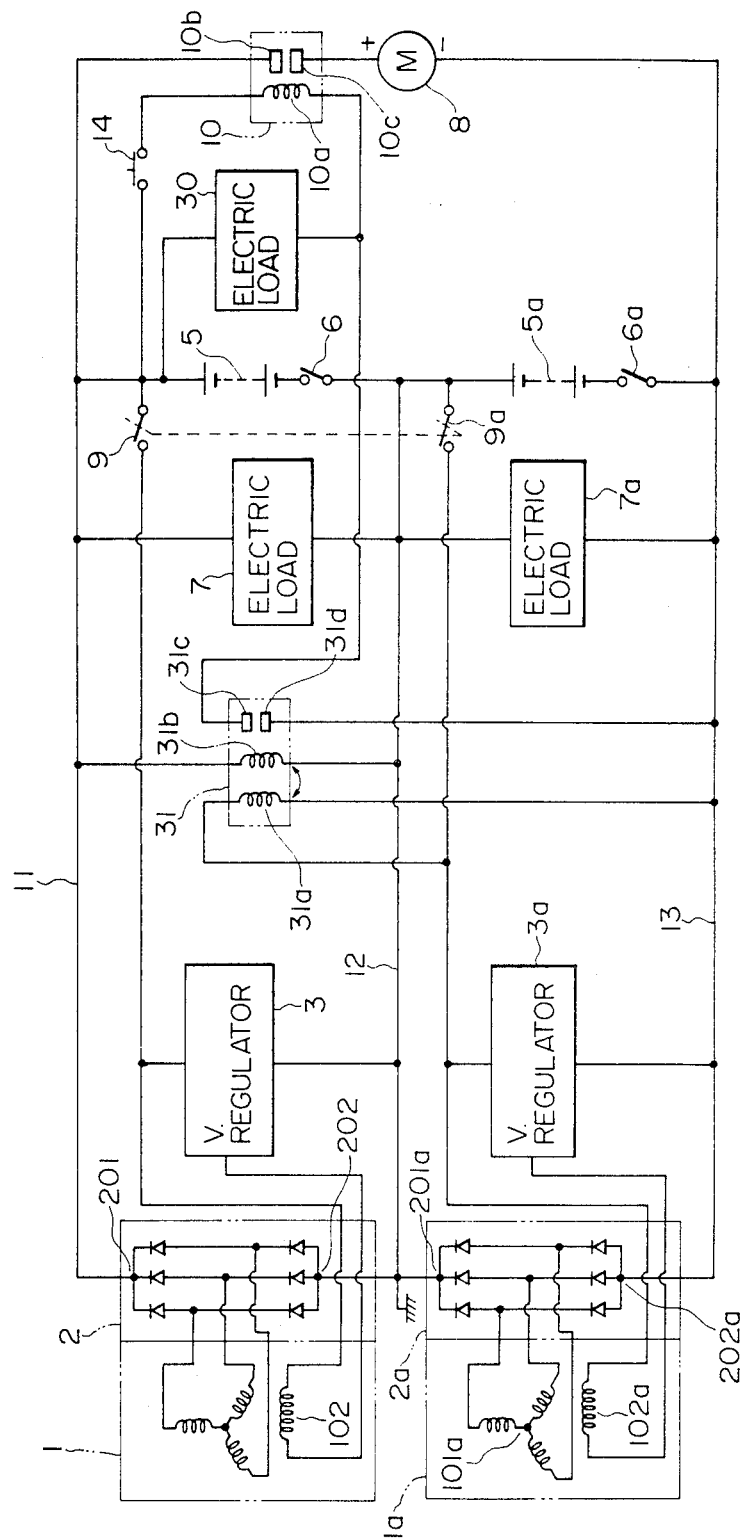
FIGS. 6 and 7 illustrate modifications of the embodiment shown in FIG. 5.

It is possible to protect the rectifiers by preventing the high current from flowing therethrough even if the contacts of the battery switch or the like are deteriorated. An embodiment based upon this concept is shown in FIGS. 5 to 7.

Figure 7:
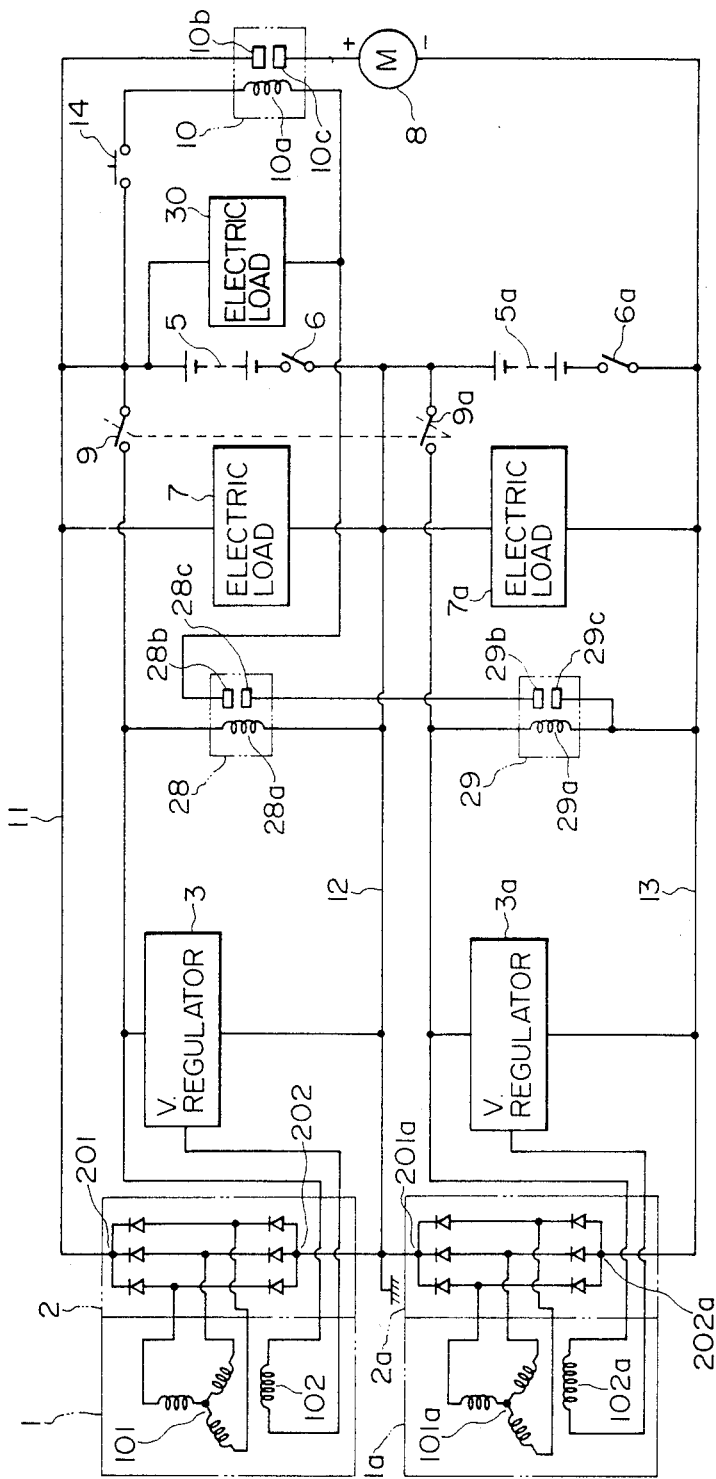

In FIG. 7, reference numeral 28 indicates a first electromagnetic relay constructed of a driving coil 28a, a normally open stationary contact 28b and a normally open movable contact 28c. Numeral 29 indicates a second electromagnetic relay constructed of a driving coil 29a, a normally open stationary contact 29b and a normally open movable contact 29c. The aforementioned driving coil 28a is connected between the plus conductor 11 and the neutral conductor 12. On the other hand, the normally open stationary contact 28b is connected to the other terminal of the driving coil 10a of the driving electromagnetic relay 10. The normally open movable contact 28c is connected to the normally open stationary contact 29b of the second electromagnetic relay 29. On the other hand, the driving coil 29a is connected between the neutral conductor 12 and the minus conductor 13. The normally open movable contact 29c is connected to the minus conductor 13.

The operation of the rectifier protecting circuit thus constructed will now be described. When the first battery switch 6, the second battery switch 6a, the first key switch 9 and the second key switch 9a are closed in the normal state in which the internal combustion engine is not running, a field current flows to the field coil 102 of the first a.c. generator 1 through the closed circuit of the plus terminal of the first storage battery 5—the first key switch 9—the field coil 102—the first voltage regulator 3—the neutral conductor 12—the first battery switch 6—the minus terminal of the first storage battery 5 so that a field magnetomotive force is generated. Likewise, a field current flows to the field coil 102a of the second a.c. generator 1a through the closed circuit of the plus terminal of the second storage battery 5a—the second key switch 9a—the field coil 102a—the second voltage regulator 3a—the minus conductor 13—the second battery switch 6a—the minus terminal of the second storage battery 5a so that a field magnetomotive force is generated. By the closures of the first and second battery switches 6 and 6a, on the other hand, the first electromagnetic relay 28 and the second electromagnetic relay 29 have their driving coils 28a and 29a energized so that their normally open movable contacts 28c and 29c are actuated to contact the normally open stationary contacts 29b and 29b, respectively. When the starting switch 14 is closed in this state, the driving coil 10a of the driving electromagnetic relay 10 is supplied with power through the closed circuit of the plus terminal of the first storage battery 5—the starting switch 14—of the driving coil 10a—the normally open stationary contact 28b and the normally open movable contact 28c of the first electromagnetic relay 28—the normally open stationary contact 29b and the normally open movable contact 29c of the second electromagnetic relay 29—the second battery switch 6a—the second storage battery 5a—the minus terminal of the first storage battery 5. As a result, the driving electromagnetic relay 10 has its normally open movable contact 10c actuated by magnetomotive force to contact the normally open stationary contact 10b. As a result, the starter motor 8 is fed with the voltage of the first and second storage batteries 5 and 5a, connected in series with each other, so that it is rotated. When the internal combustion engine is started by the rotations of the starter motor, moreover, the field coil 102 of the first a.c. generator 1 and the field coil 102a of the second a.c. generator 1a respectively generate a field magnetomotive force so that the armature coils 101 of the first a.c. generator 1 and the armature coils 101a of the second a.c. generator 1a generate a.c. outputs corresponding to their rotations. These a.c. outputs are full-wave rectified by the first and second three-phase full-wave rectifiers 2 and 2a, respectively. Moreover, the d.c. output of the first three-phase full-wave rectifier 2 charges the first storage battery 5 and is simultaneously fed to the first electric load 7. On the other hand, the d.c. output of the second three-phase full-wave rectifier 2a charges the second storage battery 5a and is simultaneously fed to the second electric load 7a. The outputs of the first and second three-phase full-wave rectifiers 2 and 2a are connected in series and are fed to the third electric load 30. The series outputs of the first and second three-phase full-wave rectifiers 2 and 2a are respectively controlled to predetermined values by the first and second voltage regulators 3 and 3a.

The first three-phase full-wave rectifier 2, e.g., is effectively prevented from damage even if the second battery switch 6a, for example, has a deteriorated contact, by the following operations: Even if the second battery switch 6a is closed, no power is fed to the driving coil 29a of the second electromagnetic relay 29 because of the deteriorated contact. This maintains the normally open stationary contact 29b and the normally open movable contact 29c in their open states. As a result, even if the starter switch 14 is closed in this state, no power is fed to the driving coil 10a of the driving electromagnetic relay 10. This brings the normally open stationary contact 10b and the normally open movable contact 10c into their open states so that no power is fed to the starter motor 8. As a result, the second rectifier 2a can be prevented from being damaged.

FIG. 6 is a block diagram showing another embodiment of the protecting circuit shown in FIG. 5. In FIG. 6, reference numeral 31 indicates an electromagnetic relay constructed of a first driving coil 31a, a second driving coil 21b, a normally open movable contact 31c and a normally closed stationary contact 31d. The first driving coil 31a has one end connected with one end of the field coil 102a of the second a.c. generator 1a and the other end connected to the minus conductor 13. The second driving coil 31b has one end connected to the plus terminal 201 of the first three-phase full-wave rectifier 2 and the other end connected to the neutral conductor 12. Moreover, the first driving coil 31a and the second driving coil 31b are wound in coacting directions relative to each other. The normally open movable contact 31c is connected to one end of the driving coil 10a of the driving electromagnetic relay 10, and the normally open stationary contact 31d is connected to the minus conductor 13. The operation of the three-wire rectifier protecting circuit thus constructed is similar to that of the FIG. 5 device, so that the first and second three-phase full-wave rectifiers 2 and 2a can be prevented from damage.

FIG. 7 is a block diagram showing still another modification of the protecting circuit shown in FIG. 5. In this embodiment, the driving coil 28a of the first electromagnetic relay 28 shown in FIG. 5 has one end connected through the first key switch 9 with the plus terminal of the first storage battery 5. On the other hand, the driving coil 29a of the second electromegnetic relay 29 has one end connected through the second key switch 9a with the plus terminal of the second storage battery 5a.

The operation of the three-phase rectifier protecting circuit thus constructed is similar to that of the device of FIG. 5.

The foregoing description is directed to the case in which the second battery switch 6a has a deteriorated contact. However, the first and second three-phase full-wave rectifiers 2 and 2a can naturally be prevented from damage in a similar manner for the cases where the first battery switch 6 develops a bad contact, the contacts at the first storage battery 5 or the second storage battery 5a become deteriorated when the starting switch 14 is closed, or where the first or second armature coils 101 or 101a fail to induce a voltage for some reason during the operation of the internal combustion engine, and there is connected a third electric load 30 such as an electric motor connected between the plus output terminal 201 of the first three-phase full-wave rectifier 2 and the minus output terminal 202a of the second three-phase full-wave rectifier 2a. Although the description of the foregoing embodiments specifies the use of electromagnetic relays, it is quite obvious that a switching circuit having semiconductor elements may be used.

Figure 8:
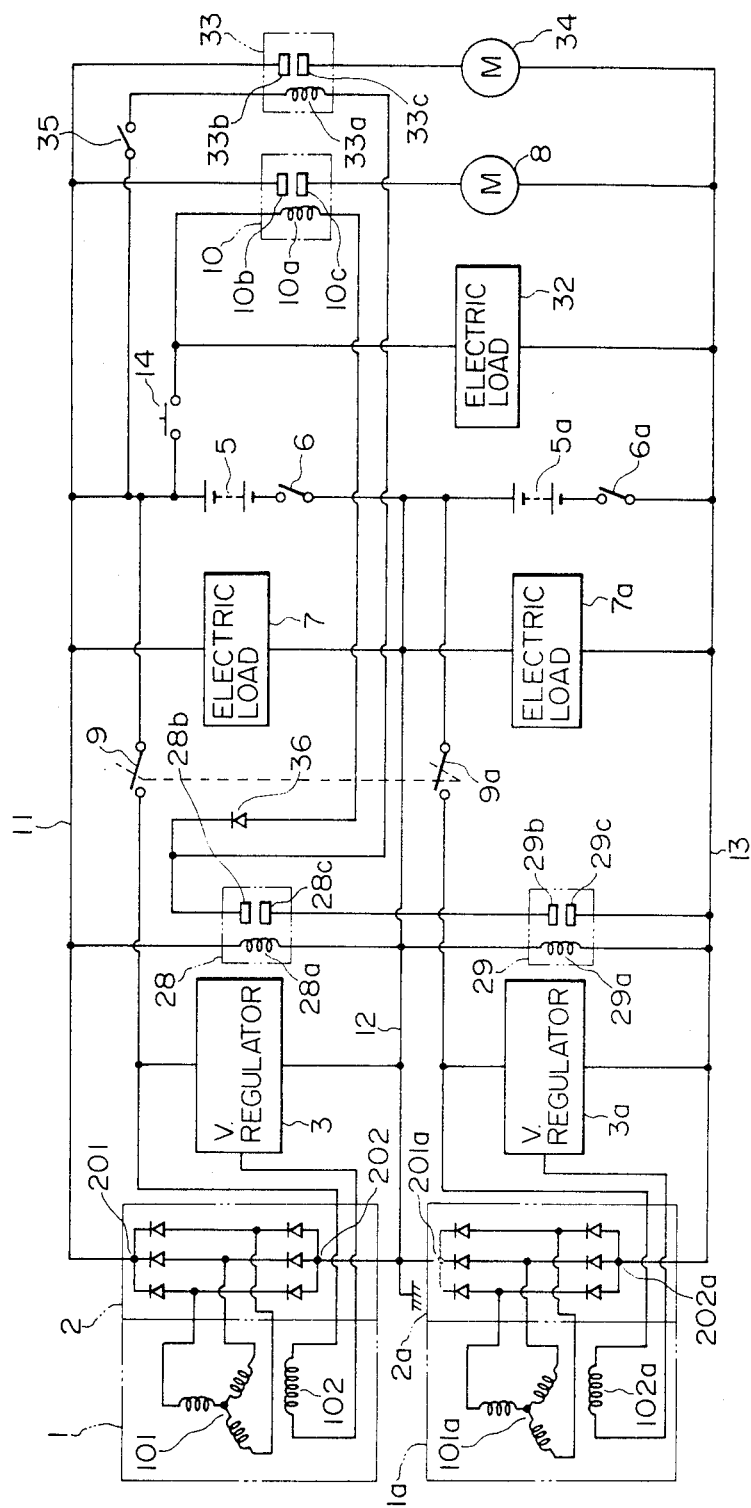
FIGS. 8 through 10 show further embodiments of rectifier protection circuits.

In a further embodiment in which a fourth electric load 34, such as an electric motor, is connected in parallel with the starting motor 8, as shown in FIG. 8, there is formed, even if the starting switch 14 is open, a closed circuit, which is partly constituted by the driving coil 33a of an electromagnetic relay 33 provided for the fourth electric load 34 and a load closing switch 35, e.g., the closed circuit of the plus terminal of the first storage battery 5—the load closing switch 35—the driving coil 33a—the driving coil 10a—the third load 32—the minus conductor 13—the second rectifier 2a. As a result, there arises a possibility that the rectifiers 2 and 2a may be damaged. On the contrary, the rectifier can be effectively protected by blocking this closed circuit. As an example, as shown in FIG. 8, it is possible to connect a diode 36 between the driving coils 33a and 10a.

Figure 9:
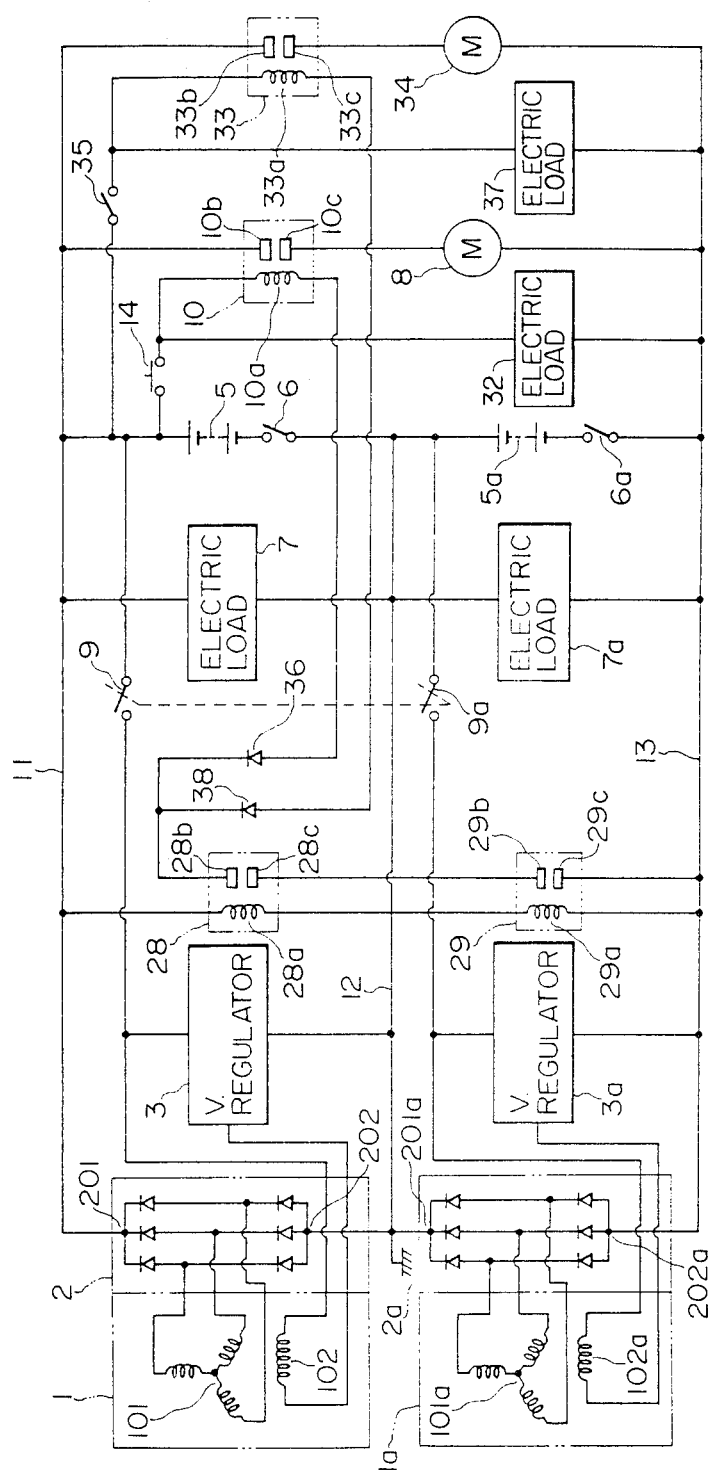

FIG. 9 is a block diagram showing another embodiment of the protecting circuit of FIG. 8. In FIG. 9, reference numeral 37 indicates a fifth electric load having one end connected to the stationary contact of the load closing switch 35 and its other end connected to the minus conductor 13. Numeral 38 indicates a diode having its cathode connected to the cathode of the diode 36 and its anode connected to one end of the driving coil 33a of the electromagnetic relay 33.

The operation of this embodiment is naturally similar to that of the FIG. 8 device. While the load closing switch 35 is open-circuited, the current flowing in the circuit through the fifth electric load 37 can be blocked by the diode 28 so that the aforementioned rectifiers 2 and 2a can be protected.

Figure 10:
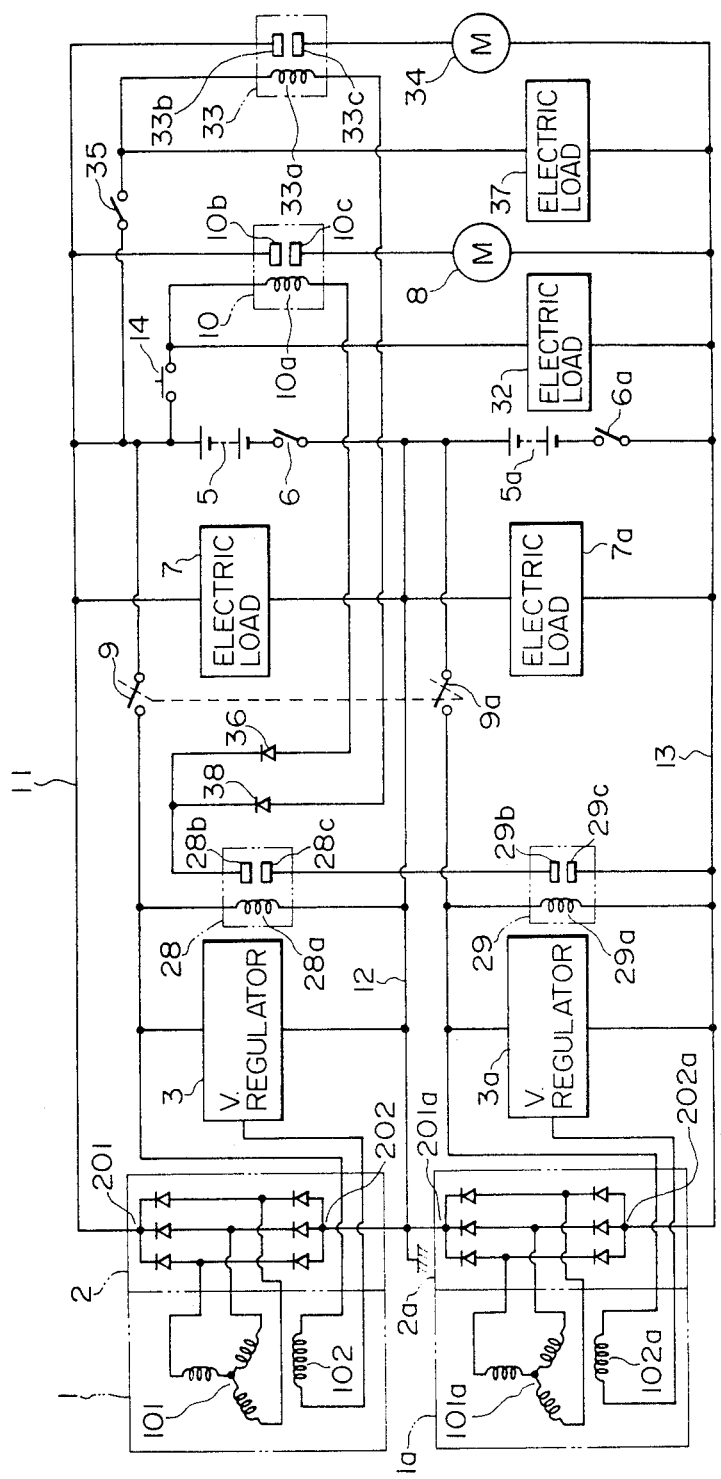

FIG. 10 is a block diagram showing another embodiment of the protecting circuit of FIG. 8. The driving coil 28a of the electromagnetic relay 28 is connected between one end of the field coil 102 of the first a.c. generator 1 and the neutral conductor 12, and the driving coil 29a of the third electromagnetic relay 29 is connected between one end of the field coil 102a of the second a.c. generator 1a and the minus conductor 13.

The operation of this modification is naturally similar to that of the FIG. 8 apparatus.

Figure 11:
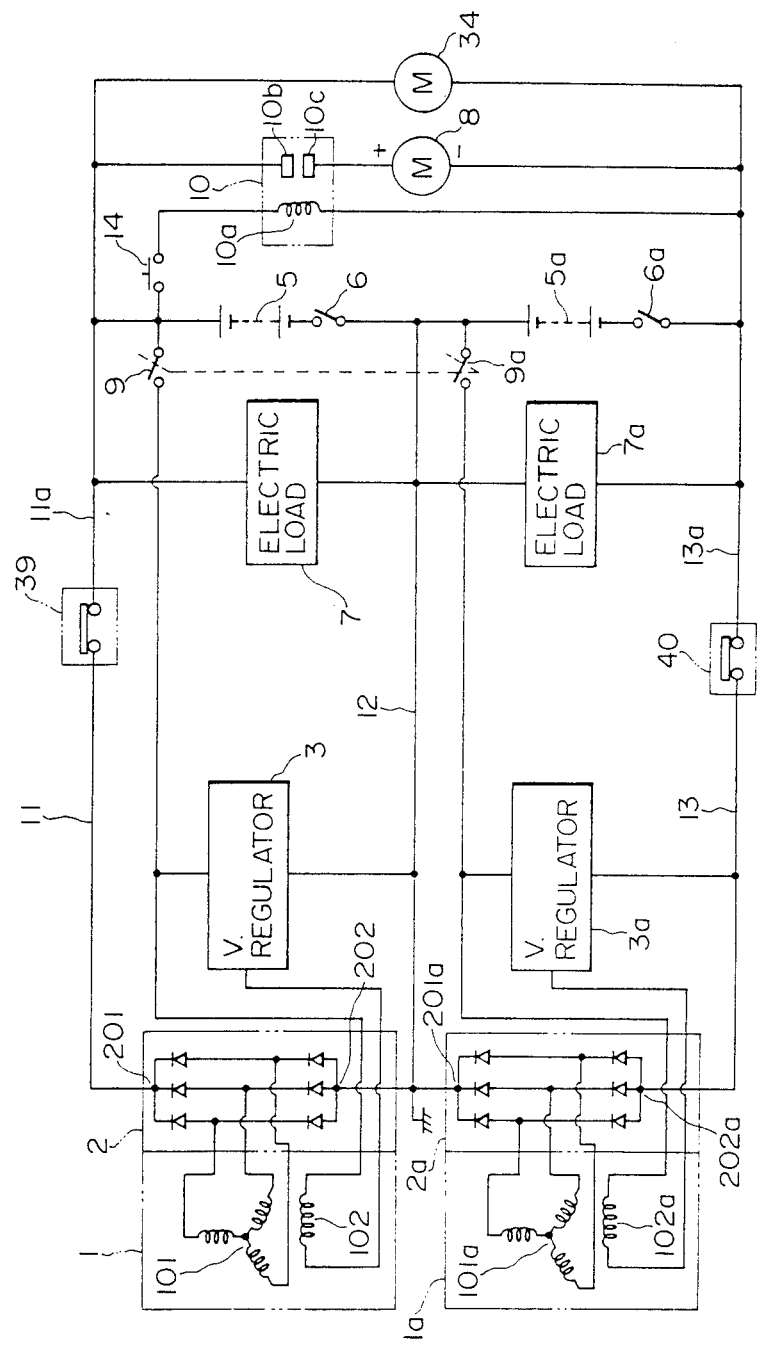
FIGS. 11 and 12 are circuit diagrams illustrating rectifier protection circuits in the form of current detecting switches.
Figure 12:
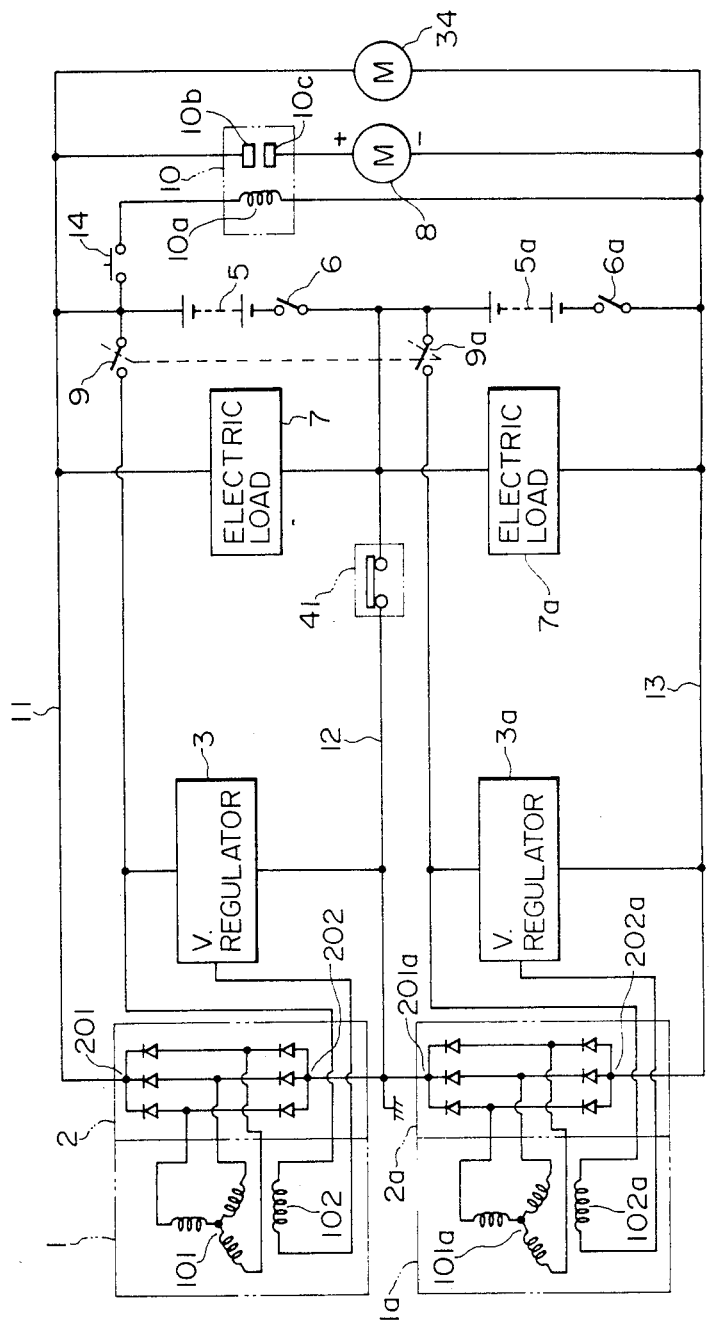

It is also possible to provide a current detecting switch which is open-circuited by the detection of a current exceeding the allowable current of the first and second rectifiers. An embodiment based upon this concept is shown in FIGS. 11 and 12. In these figures, reference numeral 39 indicates a first current detecting type self-maintained electromagnetic relay inserted in the plus conductor 11 between the rectifier and the load for detecting when a current flowing through the plus conductor 11 has exceeded the allowable current of the first three-phase full-wave rectifier 2, and thereby opening its normally closed contact. Numeral 40 indicates a second current detecting type self-maintaining electromagnetic relay similarly inserted in the minus conductor 13, for detecting when a current flowing through the conductor 13a has exceeded the allowable current of the second three-phase full-wave rectifier 2a, thereby opening its normally closed contact.

In the circuit of FIG. 11, if the second battery switch 6a, for example, develops a bad contact, the driving coil 10a of the driving electromagnetic relay 13 is energized by the closure of the starting switch 14 through the closed circuit of the plus terminal of the first storage battery 5—the starting switch 14—the driving coil 10a of the driving electromagnetic relay 10—the minus conductor 13a on the load side—the second current detecting type self-maintaining electromagnetic relay 40—the minus conductor 13 at the rectifier side—the second three-phase full-wave rectifier 2a—the neutral conductor 12—the first battery switch 6—the minus terminal of the first storage battery 5. As a result, the normally open movable contact 10c is actuated to come into contact with the normally open stationary contact 10b. As a result, current flows through the closed circuit of the plus terminal of the first storage battery 5—the normally open movable contact 10c and the normally open stationary contact 10b of the driving electromagnetic relay 10—the starting motor 8—the minus conductor 13a on the load side—the second current detecting type self-maintaining electromagnetic relay 40—the minus conductor 13 on the rectifier side—the second three-phase full-wave rectifier 2a—the neutral conductor 12—the first battery switch 6—the minus terminal of the first storage battery 5. When the current flowing through this closed circuit exceeds the allowable current of the second three-phase full-wave rectifier 2a, the second current detecting type self-maintaining electromagnetic relay detects such a current value to open the circuit. This makes it possible to reliably prevent the second three-phase full-wave rectifier 2a from being damaged.

Likewise, the first and second three-phase full-wave rectifiers 2 and 2a can be protected without fail even in cases where insufficient contact of the first battery switch 6 or insufficient contact of the terminal portion of the first or second storage battery 5 or 5a occur when the starting switch 14 is closed, or where the third electric load 34 is connected before a voltage is induced in the first or second armature coils 101 or 101a for some reason during the operation of the internal combustion engine.

The description of the foregoing embodiments has been directed to the case in which a first current detecting type self-maintaining electromagnetic relay is incorporated into the plus conductor 11 whereas a second such relay is incorporated into the minus conductor 13. Nevertheless, it is quite natural that such a relay 41 may be incorporated into the neutral conductor 12, as shown in FIG. 12, if the first and second three-phase full-wave rectifiers have an equal allowable current.

According to the embodiments thus far described in detail, a large current is prevented from flowing through the rectifiers by positively preventing the formation of any closed circuit including the rectifiers, to thereby protect the same. Of the circuit elements forming the vehicular electric system, the starter motor has a higher possibility of incurring damage and should therefore be protected by means of a protecting circuit or the like. According to the embodiment shown in FIG. 2, more specifically, in case the starter switch 14 is left closed or is closed again after the internal combustion engine has been started, the aforementioned starter motor 8 is turned at a high speed by the internal combustion engine, and may thus be broken. As a countermeasure, it is possible to detect when the internal combustion engine has reached a predetermined r.p.m. and disconnect the power supply circuit including the electric motor by means of a switching element, to thereby prevent the motor from excessive rotation. An embodiment based upon this concept is shown in FIGS. 13 and 14 and will be described in detail with reference to the same figures.

Figure 13:
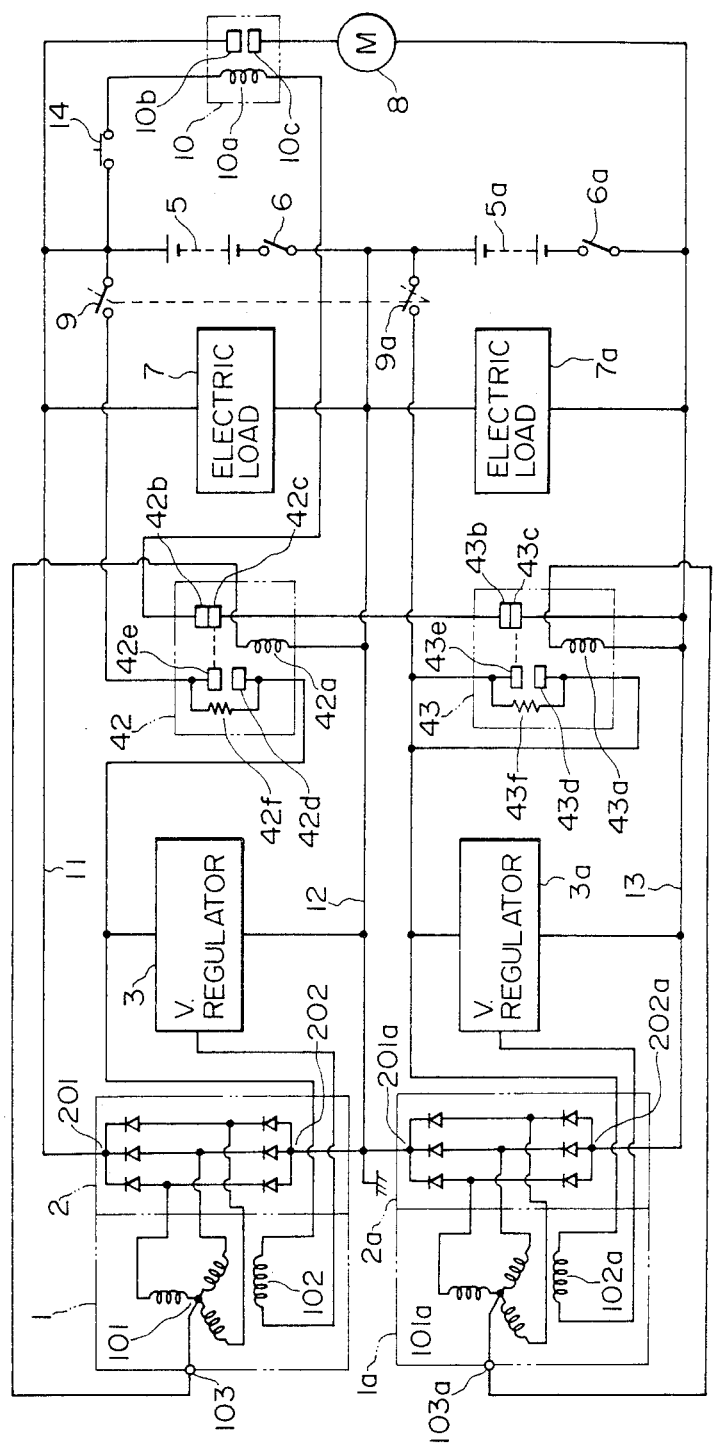
FIGS. 13 and 14 are circuit diagrams illustrating a protection circuit arrangement for preventing damage to a starter motor.
Figure 14:
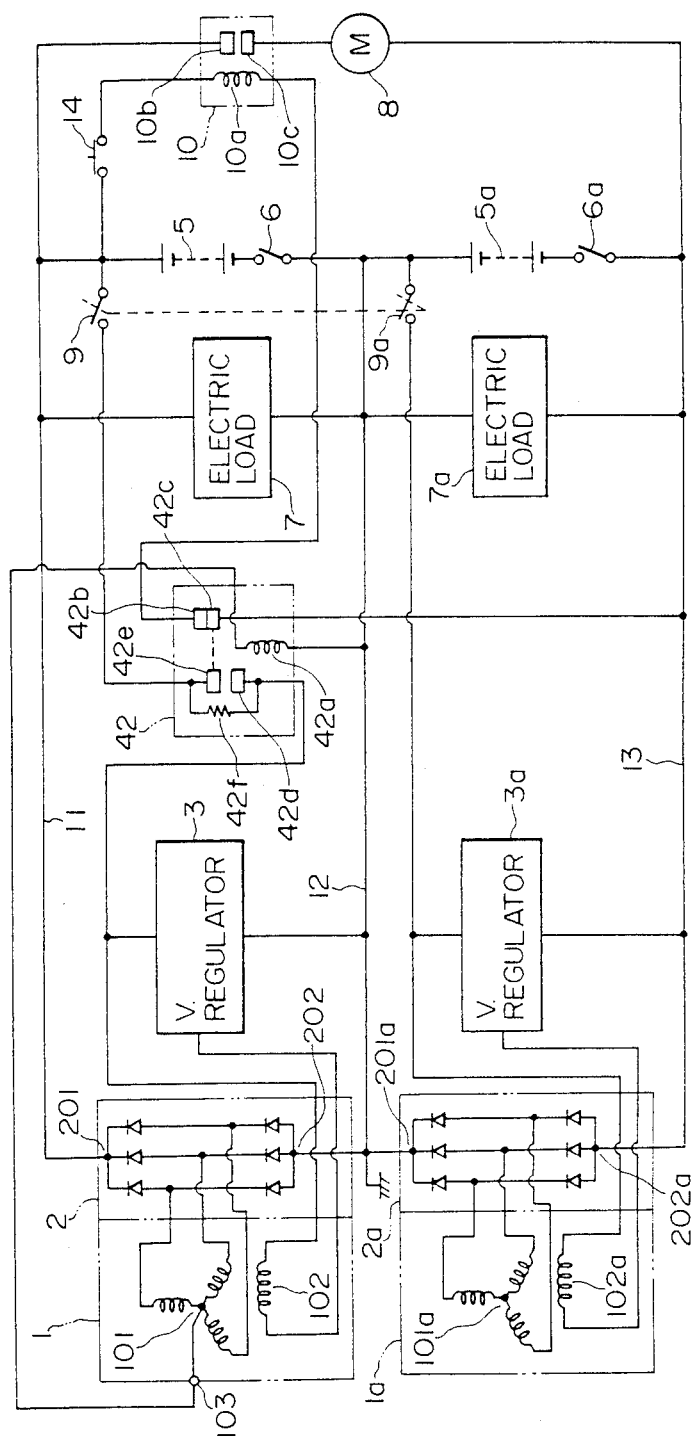

In FIG. 13, reference numeral 42 indicates a first safety relay constructed of a driving coil 42a, a normally closed stationary contact 42b, a normally closed movable contact 42c, a normally open stationary contact 42d, a normally open movable contact 42e made coactive with the aforementioned normally closed movable 42c, and a rise delaying resistor 42f for suppressing the induced voltage of the a.c. generator 1. Numeral 43 indicates a second safety relay which is constructed of a driving coil 43a, a normally closed stationary contact 43b, a normally closed movable contact 43c, a normally open stationary contact 43d, a normally open movable contact 43e made coactive with the aforementioned normally open movable contact 43c, and a rise delaying resistor 43f for suppressing the induced voltage of the second a.c. generator 1a.

In the aforementioned first safety relay 42, moreover, the driving coil 42a is connected between the neutral output terminal 103 of the first a.c. generator 1 and the neutral conductor 12. On the other hand, the normally closed stationary contact 42b is connected to one end of the driving coil 10a of the driving electromagnetic relay 10. On the other hand, the normally closed movable contact 42c is connected to the normally closed stationary contact 42b of the second safety relay 43. The normally open stationary contact 42d is connected to one end of the field coil 102 of the first a.c. generator 1, the normally open movable contact 42e is connected to the stationary contact of the first key switch 9, and the rise delaying resistor 42f is connected to both the normally open stationary contact 42d and the normally open movable contact 42e. In the second safety relay 43, moreover, the driving coil 43a is connected between the neutral output terminal 103a of the second a.c. generator 1a and the minus conductor 13; the normally closed movable contact 43c is connected to the minus conductor 13; and the normally open stationary contact 43d is connected to one terminal of the field coil 102a of the second a.c. generator 1a. The normally open movable contact 43e is connected to the stationary contact of the second key switch 9a. The rise delaying resistor 43f is connected between the normally open stationary contact 43d and the normally open movable contact 43e.

The operation of the starting motor protecting device thus constructed will now be described. When the first battery switch 6, the second battery switch 6a, the first key switch 9 and the second key switch 9a are closed, an initial field current flows to the field coil 102 of the first a.c. generator 1 through the closed circuit of the plus terminal of the first storage battery 5—the first key switch 9—the rise delaying resistor 42f of the first safety relay 42—the field coil 102 of the first a.c. generator 1—the first voltage regulator 3—the neutral conductor 12—the first battery switch 6—the minus terminal of the first storage battery 5 to generate a field magnetomotive force. Likewise, an initial field current flows to the field coil 102a of the second a.c. generator 1a through the closed circuit of the plus terminal of the second storage battery 5a—the second key switch 9a—the rise delaying resistor 43f of the second safety relay 43—the field coil 102a of the second a.c. generator 1a—the second voltage regulator 3a—the minus conductor 13—the second battery switch 6a—the minus terminal of the second storage battery 5a to generate a field magnetomotive force. When the starting switch 14 is closed in this state, the driving coil 10a of the driving electromagnetic relay 10 is fed with power through the closed circuit of the plus terminal of the first storage battery 5—the starting switch 14—the driving coil 10a—the normally closed stationary contact 42b and the normally closed movable contact 42c of the first safety relay 42—the normally closed stationary contact 43b and the normally closed movable contact 43c of the second safety relay 43—the second battery switch 6a—the second storage battery 5a—the first battery switch 6—the minus terminal of the first storage battery 5. As a result, the normally open movable contact 10c of the driving electromagnetic relay 10 is actuated to contact the normally open stationary contact 10b. As a result, the starting motor 8 is fed with the voltage of the first and second storage batteries 5 and 5a connected in series and is made to rotate. Since, in this state, the field coil 102 of the aforementioned first a.c. generator 1 and the field coil 102a of the second a.c. generator 1a respectively generate field magnetomotive forces, the voltages corresponding to the r.p.m. of the first and second a.c. generators 1 and 1a are respectively induced at their armature coils 101 and 101a in response to the start of the internal combustion engine. At this time, the voltage at the neutral output terminal 103 of the first a.c. generator 1 is applied to the driving coil 42a of the first safety relay 42, and the voltage at the neutral output terminal 103a of the second a.c. generator 1a is applied to the driving coil 43a of the second safety relay 43. When these voltages reach a value corresponding to the started r.p.m. of the internal combustion engine, predetermined currents respectively flow in the driving coils 42a and 43a. As a result, the normally closed movable contact 42c and the normally closed movable contact 43c are respectively actuated to separate from the normally closed stationary contact 42b and the normally closed stationary contact 43b, respectively. As a result, the power supply to the driving coil 10a of the driving electromagnetic relay 10 is blocked so that the normally open movable contact 10c is actuated to separate from the normally open stationary contact 10b. Accordingly, the rotation of the starting motor 8 is stopped. Thus, where the internal combustion engine reaches a relatively high r.p.m. after being started, the starting motor 8 is not rotated at a speed higher than a predetermined r.p.m. even if the starting switch 14 is closed, so that it can be protected against breakage. Simultaneously, moreover, as a result of the power supply to the driving coil 42a of the aforementioned first safety relay 42 and to the driving coil 43a of the second safety relay 43, the normally open movable contact 42d and the normally open movable contact 43d are actuated to contact the normally open stationary contact 42e and the normally open stationary contact 43e, respectively. As a result, the rise delaying resistors 43f and 43f are short-circuited. Moreover, since the field coil 102 of the aforementioned first a.c. generator 1 and the field coil 102a of the second a.c. generator 1a are respectively driven directly through the first and second voltage regulators 3 and 3a, predetermined field currents flow so that the outputs of the first and second a.c. generators 1 and 1a can be extracted, as designed.

FIG. 14 is a block diagram showing another embodiment of the protecting device shown in FIG. 13. In this embodiment, the starting motors are prevented from being damaged exclusively by the first safety relay 42. The operation of this embodiment is naturally similar to that of FIG. 13.

Although the neutral output terminal is at the voltage of the neutral point in the foregoing embodiments, like effects can be attained even if a single-phase voltage, a three-phase auxiliary diode output voltage, a neutral point or a single-phase ripple frequency is detected. Although an electromagnetic relay is used as the safety relay, moreover, a semiconductor relay may of course be used.

Finally, in the electrical system thus far described, if an internal combustion engine such as a Diesel engine cannot be stopped as a result that the first and second key switches are open-circuited, it is necessary to close the first and second key switches even after the internal combustion engine has been killed. This raises a defect in that the field currents flow in the respective field coils so that the first and second storage batteries are discharged.

It is, therefore, desirable that the storage batteries can be prevented from being discharged even if the closure of the starter switch is forgotten. For this purpose, it is possible to close first and second normally open switch means, which are respectively connected in series with the respective field coils of the first and second a.c. generators, in response to the output voltage of at least one of the first and second a.c. generators when the starting switch is closed, and to provide a storage battery discharge prevention circuit, which has a self-maintaining function so as to close the first and second switch means after the rotation of the first and second a.c. generators has been stopped and before a predetermined period of time has elapsed, so that the aforementioned first and second switch means are opened after the lapse of the predetermined time period to open the closed circuit, which might otherwise be formed, thereby to prevent the first and second storage batteries from being discharged.

Figure 15:
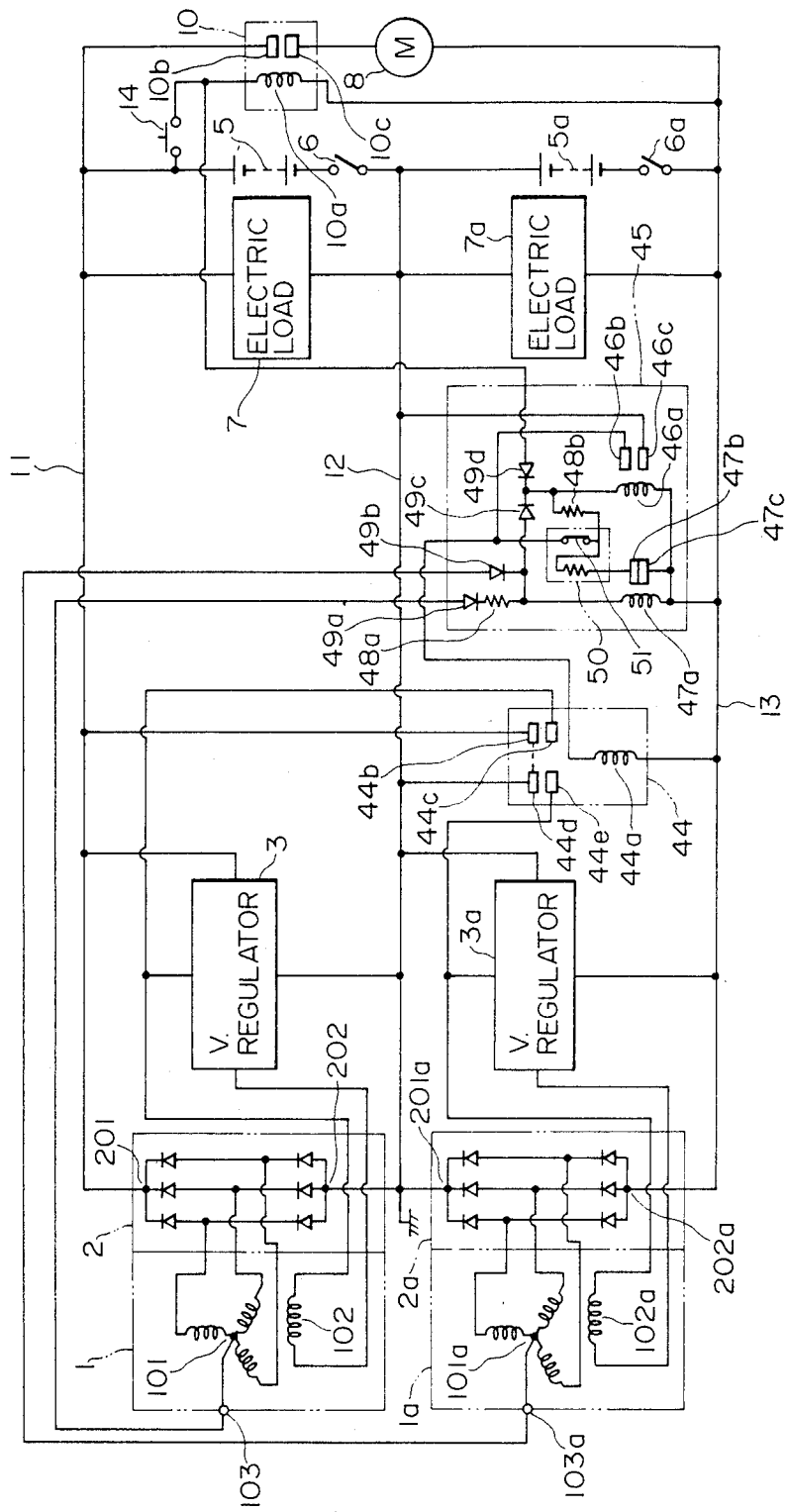
FIG. 15 is a circuit diagram showing one embodiment of a storage battery discharge prevention circuit.

FIG. 15 is a block diagram showing one embodiment of the vehicular electrical system equipped with the aforementioned discharge prevention circuit. In these figures, reference numeral 44 indicates a first electromagnetic relay constructed of a driving coil 44a having one end connected to the minus conductor 13, a first normally open movable contact 44b connected to the plus conductor 11, a first normally open stationary contact 44c connected to one end of the field coil 102 of the first a.c. generator 1, a second normally open movable contact 44d connected to the neutral conductor 12, and a second normally open stationary contact 44e connected to one end of the field coil 102a of the second a.c. generator 1a. Numeral 45 indicates a second electromagnetic relay constructed of a first driving contact 46a, a first normally open movable contact 46b and a first normally open stationary contact 46c adapted to be actuated to contact each other by the energization of the first driving coil 46a, a second driving coil 47a, a second normally closed movable contact 47b and a second normally closed stationary contact 47c adapted to be actuated to contact each other by energization of the second driving coil 47a, voltage dividing resistors 48a and 48b, diodes 49a to 49d, a heater 50 and a normally closed bimetal switch 51 adapted to be open-circuited after the elapse of a predetermined period of time by the heating operation of the heater 50.

The operations of the electrical system thus constructed will now be described. When the starter switch 14 is closed, the driving coil 10a of the driving electromagnetic relay 10 is energized. By this energization, the normally open movable contact 10c is actuated to contact the normally open stationary contact 10b. As a result, the starting motor 8 is fed with power so as to be made to rotate. Then, the internal combustion engine is started. By the close of the starting switch 14, on the other hand, the first driving coil 46a of the second electromagnetic relay 45 is energized through the closed circuit of the plus terminal of the first storage battery 5—the starting switch 14—the first driving coil 46a—the minus conductor 13—the second storage battery 5a—the minus terminal of the first storage battery 5. As a result, the first normally open movable contact 46b is actuated to contact the first normally open stationary contact 46g. As a result, the driving coil 44a of the first electromagnetic relay 44 is energized through the closed circuit of the plus terminal of the second storage battery 5a—the first normally open movable contact 46b and the first normally stationary contact 46c of the second electromagnetic relay 45—the driving coil 44a—the minus conductor 13—the minus terminal of the second storage battery 5a. As a result, the first normally open movable contact 44b and the second normally open movable contact 44d are actuated to respectively contact the first normally open stationary contact 44c and the second normally open stationary contact 44e. Accordingly, field current flows to the field coil 102 of the first a.c. generator 1 through the closed circuit of the plus terminal of the first storage battery 5—the plus conductor 11—the first open movable contact 44b and the first normally open stationary contact 44c of the first electromagnetic relay 44—the field coil 102—the first voltage regulator 3—the neutral conductor 12—the minus terminal of the first storage battery 5, to generate a field magnetomotive force.

Likewise, field current flows to the field coil 102a of the second a.c. generator 1a through the closed circuit of the positive terminal of the second storage battery 5a—the neutral conductor 12—the second normally open movable contact 44d and the second normally open stationary contact 44e of the first electromagnetic relay 44—the field coil 102a—the second voltage regulator 3a—the minus conductor 13—the minus terminal of the second storage battery 5a, to generate a field magnetomotive force. When the internal combustion engine is driven in this state, a.c. outputs are induced at the armature coils 101 of the first a.c. generator 1 and at the armature coils 101a of the second a.c. generator 1a. These a.c. outputs are full-wave rectified at 2 and 2a, respectively. Moreover, the resultant rectified outputs are respectively led to the first and second electric loads 7 and 7a. On the other hand, the rectified outputs are respectively limited to predetermined values by the actions of the first and second voltage regulators 3 and 3a. Moreover, the neutral outputs of the first and second a.c. generators 1 and 1a are applied to the closed circuit of either (the neutral output terminal 103—the diode 49a—the voltage dividing resistor 48a) or (the neutral output terminal 103a—diode 49b)—either (the second driving coil 47a) or (the diode 49c—the first driving coil 46a)—the minus conductor 13, to thereby energize the first driving coil 46a. As a result, even after the starting switch 14 has been open-circuited, the first normally movable contact 46b and the first normally open stationary contact 46c of the second electromagnetic relay 45 are maintained in their contacted state. This makes it possible to supply field currents to the field coil 102 of the first a.c. generator 1 and the field coil 102a of the second a.c. generator 1a. As a result, if the internal combustion engine is killed, the output disappears from the neutral point of the first and second a.c. generators 1 and 1a. Thus, as has been described hereinbefore, the second driving coil 47a of the second electromagnetic relay 45 is deenergized so that the second normally closed movable contact 47b is restored to contact the second normally closed stationary contact 47c. On the other hand, the first driving coil 46a of the second electromagnetic relay 45 maintains itself through the closed circuit of the plus terminal of the second storage battery 5a—the first normally open stationary contact 46c and the first normally open movable contact 46b—the bimetal switch 51—either (the voltage dividing resistor 48b—the first driving coil 46a) or (the heater 50—the second normally closed movable contact 47b and the second normally closed stationary contact 47c)—the minus conductor 13—the minus terminal of the second storage battery 5a, so that the first normally open movable contact 46b and the first normally open stationary contact 46c are maintained in their closed states. Moreover, these self-maintaining states are released by the heat generation of the heater 50 through the action of the bimetal switch 51 after the lapse of a predetermined time period. As a result, when the self-maintenance is released, the normally open movable contact 46c and the normally open stationary contact 46c are opened, and the driving coil 45a of the first electromagnetic relay 45 is deenergized. Then, the first normally open movable contact 45b and the second normally open movable contact 45d are actuated to respectively open the first normally open movable contact 45b and the first normally open stationary contact 45c, and the second normally open movable contact 45d and the second normally open stationary contact 45e. This blocks the field currents, which have been flowing through the field coil 102 of the first a.c. generator 1 and the field coil 102a of the second a.c. generator 1a. Thus, after a predetermined period of time has elapsed after the stoppage of the internal combustion engine, the field currents flowing through the field coils 102 and 102a are automatically blocked so that the first and second storage batteries 5 and 5a can be prevented from being discharged.

The foregoing description is directed to the case in which the voltage at the neutral point of the a.c. generators is used and in which electromagnetic relays are used. Nevertheless, it is quite obvious that the single-phase output of an a.c. generator, the three-phase output voltage of an auxiliary diode or their generated frequencies may be used. Moreover, the foregoing description describes a case the heater and the bimetal are used as a timelimiting mechanism. Like effects can naturally be attained by the combination of a timer using semiconductor elements and a semiconductor switch.

As has been described in detail hereinbefore, according to the present invention, a direct-current three-wire electric system is provided which enjoys a long lifetime, and high reliability. Moreover, since a partial closed circuit in the electrical system, which might otherwise invite damage to the circuit elements and consumption of the batteries, is positively prevented from being formed, it is possible to provide an electrical system having excellent reliability.

What is claimed is:

1. A direct-current three-wire electrical system for a vehicle, comprising: an alternating-current generator including first and second field coils magnetically separated from each other, a first armature coil facing said first field coil, a second armature coil facing a second field coil; a first rectifier for rectifying the a.c. output of the first armature coil; a second rectifier for rectifying the a.c. output of said second armature coil; a first storage battery connected between the plus and minus output terminals of said first rectifier; a second storage battery connected between the plus and minus output terminals of said second rectifier; a starting motor connected between the plus output terminal of said first rectifier and the minus output terminal of said second rectifier; a first voltage regulator for controlling the output voltage of said first armature coil to a first predetermined value by detecting the rectified output voltage between the plus and minus output terminals of said first rectifier to control the field current flowing in said first field coil; a second voltage regulator for controlling the output voltage of said second armature coil to a second predetermined value by detecting the rectified output voltage between the plus and minus output terminals of said second rectifier to control the field current flowing through said second field coil; a neutral conductor or a body grounded conductor connecting in common the minus output terminal of said first rectifier and the plus terminal of said second rectifier, and the minus terminal of said first storage battery and the plus terminal of said second storage battery; and switching means associated with said first and second storage batteries for connecting said first voltage regulator and said second voltage regulator in circuit with said first battery and said second battery, respectively.

2. A system as claimed in claim 1, wherein said switching means comprises a single switching means, output means of said first and second voltage regulators being rendered conductive upon closing said single switching means, to excite said field coils of said first and second AC generators through said output means.

3. A system as claimed in claim 1, further comprising first and second battery switches, a first switching circuit operable to be closed upon closure of said first battery switch for providing current to said first field coil, a second switching circuit operable to be closed upon closure of said second battery switch for providing current to said second field coil, a start switch, and a third switching circuit operable to be closed only when both said first and second switching circuits are closed, said starting motor being operated upon closing said third switching circuit.

4. A system as claimed in claim 1, further comprising electrical load means and diode means, a start switch which is closed to establish a closed circuit to initiate operation of said vehicle and said alternating-current generator, said diode means being provided to interrupt said closed circuit including said electrical load means actuated upon closing said start switch which is formed when said start switch is reopened.

5. A system as claimed in claim 1, further comprising closed circuits for initiating operation of said vehicle and said alternating-current generator and means for interrupting said closed circuits including said first and second rectifiers, respectively, when an excessively large current flowing through said closed circuits is detected.

6. A system as claimed in claim 1, further comprising means for preventing undesired discharge of said first and second storage batteries, said preventing means including first normally opened switching means and second normally opened switching means connected in series with said field coils, respectively, a start switch which is closed to establish a closed circuit to initiate operation of said vehicle and said alternating-current generator, said switching means being closed when said start switch is closed and at least one of said generators produces an output, and said switching means being continuously maintained closed for a predetermined period of time after said generators are stopped.

7. A system as claimed in claim 1, further comprising a safety circuit including at least one driving coil in a relay excited by the output of at least one of said generators when the rotational speed of said generator exceeds a predetermined value, and a switching element in said relay operable to be opened in response to the exciting of said driving coil, an electric power supply to said start motor being interrupted by the opening of said switching element of said safety circuit.

8. A system as claimed in claim 1, wherein said switching means comprises a pair of key switch means ganged for conjunctive operation.

9. A system as claimed in claim 5, said interrupting means being provided in said neutral conductor.

10. A system as claimed in claim 5, said interrupting means being provided in plus and minus conductors extending from the plus terminal of said first rectifier and the minus terminal of said second rectifier, respectively.

11. A system as claimed in claim 6, further comprising delay switch means for opening at least one of said switching means after said predetermined time.

12. A system as claimed in claim 11, said delay switch means including a heater and bimetal switch means.

13. A system as claimed in claim 7, said drive means comprising a drive coil, a neutral output terminal of at least one of said armatures being connected to said drive coil.

14. A system as claimed in claim 7, said drive means comprising at least a drive coil, a neutral output terminal of at least of said armatures being connected to said safety circuit.

15. A system as claimed in claim 1 wherein said switching means comprises coactive first key switch means and second key switch means respectively connected to said first battery and said second battery.

* * * * *